(12) United States Patent
Katou

(10) Patent No.: US 7,128,688 B2
(45) Date of Patent: Oct. 31, 2006

(54) HYDRAULIC CONTROL FOR AUTOMATIC TRANSMISSION

(75) Inventor: Yoshiaki Katou, Kanagawa (JP)

(73) Assignee: JATCO Ltd, Fuji (JP)

( * ) Notice: Subject to any disclaimer, the term of this patent is extended or adjusted under 35 U.S.C. 154(b) by 147 days.

(21) Appl. No.: 10/828,265

(22) Filed: Apr. 21, 2004

(65) Prior Publication Data

US 2004/0214686 A1    Oct. 28, 2004

(30) Foreign Application Priority Data

Apr. 25, 2003 (JP) ............................. 2003-122958
Apr. 25, 2003 (JP) ............................. 2003-122959

(51) Int. Cl.
*F16H 59/64* (2006.01)
*F16H 61/26* (2006.01)
*B60W 10/02* (2006.01)
*G05D 11/00* (2006.01)

(52) U.S. Cl. ...................... 477/98; 477/156; 192/3.57; 137/112

(58) Field of Classification Search .................. 477/98, 477/127, 156, 158, 167, 174, 180; 475/159; 192/3.52, 3.56–3.58, 83, 113.3, 113.31; 137/111–2
See application file for complete search history.

(56) References Cited

U.S. PATENT DOCUMENTS

| | | | | |
|---|---|---|---|---|
| 3,589,483 A | * | 6/1971 | Smith | 192/3.52 |
| 4,324,320 A | * | 4/1982 | Spurlin et al. | 188/271 |
| 5,115,694 A | * | 5/1992 | Sasaki et al. | 477/98 |
| 5,261,295 A | * | 11/1993 | Iwanaga et al. | 477/98 |
| 5,314,385 A | | 5/1994 | Haley et al. | |
| 5,347,886 A | | 9/1994 | Mainquist et al. | |
| 5,674,150 A | * | 10/1997 | Morishita et al. | 477/39 |
| 5,726,353 A | * | 3/1998 | Matsuda et al. | 73/118.1 |
| 5,957,260 A | * | 9/1999 | Kunii | 192/85 R |
| 6,123,645 A | * | 9/2000 | Hopper | 477/164 |
| 6,155,396 A | * | 12/2000 | Tsubata et al. | 192/85 R |
| 6,500,090 B1 | * | 12/2002 | Kanda et al. | 477/45 |
| 2002/0028725 A1 | | 3/2002 | Totsuka et al. | |
| 2005/0211295 A1 | * | 9/2005 | Long et al | 137/112 |

FOREIGN PATENT DOCUMENTS

| | | |
|---|---|---|
| DE | 198 48 935 A1 | 4/2000 |
| EP | 1 167 832 A2 | 1/2002 |
| EP | 1 191 258 A2 | 3/2002 |
| JP | 360179552 A * | 9/1985 ............ 77/98 |

OTHER PUBLICATIONS

Service Manual for *Fit*, Book Structure, 4-18 Honda Multimatic Transmission, published by Honda Motor Co., Ltd., Jun. 2001, 3 pages.

* cited by examiner

*Primary Examiner*—Roger Pang
(74) *Attorney, Agent, or Firm*—Foley & Lardner LLP

(57) ABSTRACT

A hydraulic control system for an automatic transmission includes a lubrication passage for feeding lubricating oil to a wet clutch and lubrication points of the transmission, first and second passages with a large-diameter orifice and a small-diameter orifice, respectively, arranged upstream of the lubrication passage, a switching valve for switching fluid communication between the lubrication passage and the first and second passages, a solenoid for controlling the switching valve, and an ECU for controlling the solenoid.

26 Claims, 10 Drawing Sheets

US 7,128,688 B2

HYDRAULIC CONTROL FOR AUTOMATIC TRANSMISSION

BACKGROUND OF THE INVENTION

The present invention relates generally to hydraulic control for an automatic transmission, and more particularly, to lubrication control of a start clutch of a V-belt type continuously variable transmission (CVT).

As described in Service Manual for Fit, Book Structure, 4–18 Honda Multimatic Transmission, published by Honda Motor Co., Ltd. on June, 2001, a wet start clutch typically adopts a shaft-center lubrication method wherein an output shaft with a hollow portion serves as a lubrication passage to ensure lubrication of the clutch. Hydraulic oil discharged from a pump is used as lubricating oil to be supplied to the clutch.

With the above lubrication method, however, the output shaft is not rotated when the vehicle is at a standstill, producing no centrifugal hydraulic pressure. Then, supplied lubricating oil is not discharged smoothly, resulting in greater drag torque due to occurrence of agitation of lubricating oil at the clutch. When carrying out neutral-drive (N-D) select at a very low temperature, particularly, drag torque is further greater due to greater viscosity of lubricating oil, reducing the engine speed, leading to possible occurrence of engine stop.

SUMMARY OF THE INVENTION

It is, therefore, an object of the present invention to provide hydraulic control for an automatic transmission, which allows lubrication in accordance with the vehicle operating conditions.

The present invention provides generally a hydraulic control system for an automatic transmission with a wet clutch serving as a start element and points to be lubricated, comprising: a lubrication passage which feeds a lubricating oil to the wet clutch and the points of the transmission; a first passage with a large-diameter orifice; a second passage with a small-diameter orifice, the first and second passages being arranged upstream of the lubrication passage; a switching valve which switches fluid communication between the lubrication passage and the first and second passages; a distribution controller which controls the switching valve; and an electronic control unit (ECU) which controls the distribution controller.

An essential feature of the present invention lies in providing a method of controlling a hydraulic system for an automatic transmission with a wet clutch serving as a start element and points to be lubricated, the system comprising: a lubrication passage which feeds a lubricating oil to the wet clutch and the points of the transmission; a first passage with a large-diameter orifice; a second passage with a small-diameter orifice, the first and second passages being arranged upstream of the lubrication passage; a switching valve which switches fluid communication between the lubrication passage and the first and second passages; and a distribution controller which controls the switching valve, the method comprising: determining whether or not a vehicle is at a standstill; determining, when the vehicle is at a standstill, whether or not a temperature of the lubricating oil is equal to or smaller than a first predetermined temperature; and controlling, when the temperature is equal to or smaller than the first predetermined temperature, the distribution controller to control the switching valve so as to shut off fluid communication between the lubrication passage and the first and second passages.

BRIEF DESCRIPTION OF THE DRAWINGS

The other objects and features of the present invention will become apparent from the following description with reference to the accompanying drawings, wherein.

DETAILED DESCRIPTION OF THE INVENTION

Figure 1:
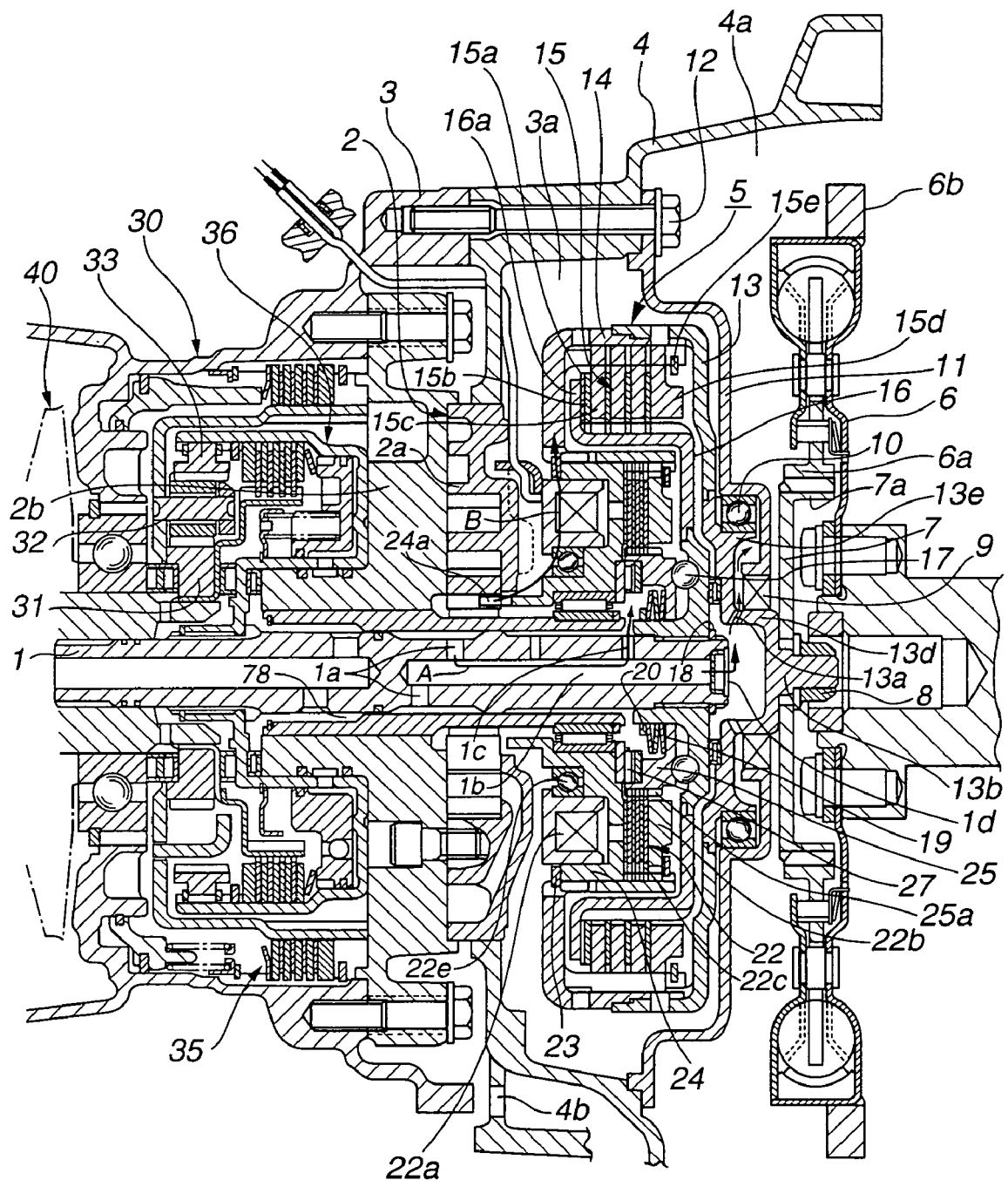
FIG. 1 is a sectional view showing an electromagnetic multiple disc clutch of a transmission unit and its periphery, to which a first embodiment of hydraulic control for an automatic transmission is applied.

Referring to the drawings, a description will be made about hydraulic control for an automatic transmission embodying the present invention.

Referring to FIGS. 1–6B, there is shown first embodiment of the present invention. Referring to FIG. 1, a transmission unit to which the first embodiment is applied comprises an electromagnetic multiple disc clutch or start clutch 5 and a forward/reverse switching mechanism 30. Output torque of an engine, not shown, is provided to a V-belt type CVD 40 through the multiple disc clutch 5 and the forward/reverse switching mechanism 30. The forward/reverse switching mechanism 30 comprises a planetary-gear set comprising a sun gear 31 rotating together with an input shaft of the CVT 40, a pinion carrier 32, and a ring gear 33 rotating together with an input shaft 1, a reverse brake 35 for fixing the pinion carrier 32 to a transmission casing 3, and a forward clutch 36 for engaging the sun gear 31 and the ring gear 33. A description about the CVT 40 is left out, since its structure is commonly known in the art.

The electromagnetic multiple disc clutch 5 will be described in detail. Referring to FIG. 1, an input-clutch housing 4 is mounted to the transmission casing 3 at a front-end opening thereof. A front cover 11 is attached to the input-clutch housing 4 by a bolt 12, thereby defining a first accommodation chamber 4a opening into the atmosphere and serving to accommodate a torsional damper 6. The transmission casing 3, part of the input-clutch housing 4, and the front cover 11 cooperate with each other to define a second accommodation chamber 3a subjected to oil lubrication.

An oil pump 2 is interposed between the transmission casing 3 and the input-clutch housing 4. The oil pump 2 includes an ordinary gear pump constructed by accommodating an internal-gear-pump element in a space defined by a pump housing 2a and a pump cover 2b. A stationary hollow sleeve (not labeled) is engaged on the inner periphery of the pump cover 2b to rotatably fit the input shaft 1 therein.

The electromagnetic multiple disc clutch 5 is disposed on a front end of the input shaft 1 protruding in the input-clutch housing 4. The multiple disc clutch 5 comprises a pilot clutch 22, a main clutch 15 disposed on the outer periphery of the pilot clutch 22, and a loading cam 17 disposed on the inner periphery of the pilot clutch 22.

An input drum 13 of the main clutch 15 comprises a shank 13b for fixing an input hub 7 by a nut 8, a small-diameter shaft 13d serving as a slide portion with an oil seal 9, and a bearing support 13e for supporting the input drum 13 by the front cover 11 through a bearing 10.

Power of the engine is transferred to input drums 13, 14 of the main clutch 15, i.e. the drive side, through the torsional damper 6 integrated with a drive plate 6b and the input hub 7. The power transfer parts include input hub 7 fixed to the input drum 13 which rotates together with an output member 6a of the torsional damper 6, input drum 14 splined to the input drum 13, and a rotor 24 of the pilot clutch 22 engaged with the input drum 14 for unitary rotation. One end 24a of the rotor 24 is formed with a drive pawl of the oil pump 2.

When electromagnetic force is generated in an electromagnet 22a to attract a retaining plate 22b and a metal plate 22c to thereby cause engagement of the pilot clutch 22, engine rotation is input to the loading cam 17. By the cam action of the loading cam 17 obtained by a ball rolling on the inclined surface, thrust force is generated in a main clutch hub 16, i.e. the driven side. On the other hand, thrust force as reaction force acts on the input drum 14, the rotor 24, and the electromagnet 22a through a thrust bearing 27 against a return disc spring 19 held by a snap ring 20.

The main clutch hub 16 is splined to the input shaft 1. With the input drum 14 of the main clutch 15 shifted leftward, a clutch plate 15c is engaged with the main clutch 15 for unitary rotation. The main clutch hub 16 is engaged with a facing plate 15b having a friction-material facing bonded on both sides for unitary rotation. The clutch plate 15c and the facing plate 15b are disposed axially alternately.

Lubrication of the electromagnetic multiple disc clutch 5 will be described. By the centrifugal-pump action, lubricating oil derived from a control-valve circuit, not shown, is fed to the pilot clutch 22 and the main clutch 15 for lubrication through an opening 1a, a hollow 1b, and an opening 1c of the input shaft 1 as indicated by arrow A in FIG. 1. The input drums 13, 14 are formed with a plurality of openings, not shown, through which lubricating oil is transferred and accumulated in a space hermetically enclosed by the front cover 11 and the clutch housing 4, then returned to an oil pan, not shown, arranged in the transmission casing 3 through a drain port 4b which opens at a lower end of the clutch housing 4.

Moreover, lubricating oil is fed to the rotor 24 and a bearing 22e for lubrication and also to the electromagnet 22a for cooling as indicated by arrow B in FIG. 1 through a lubrication passage arranged in the vicinity of the oil-pump drive pawl 24a of the rotor 24. In such a way, lubrication of the pilot clutch 22 and the clutch plate 15c of the main clutch 15 and that of the bearing 22e and the electromagnet 22a are ensured by different lubrication systems.

Figure 2:
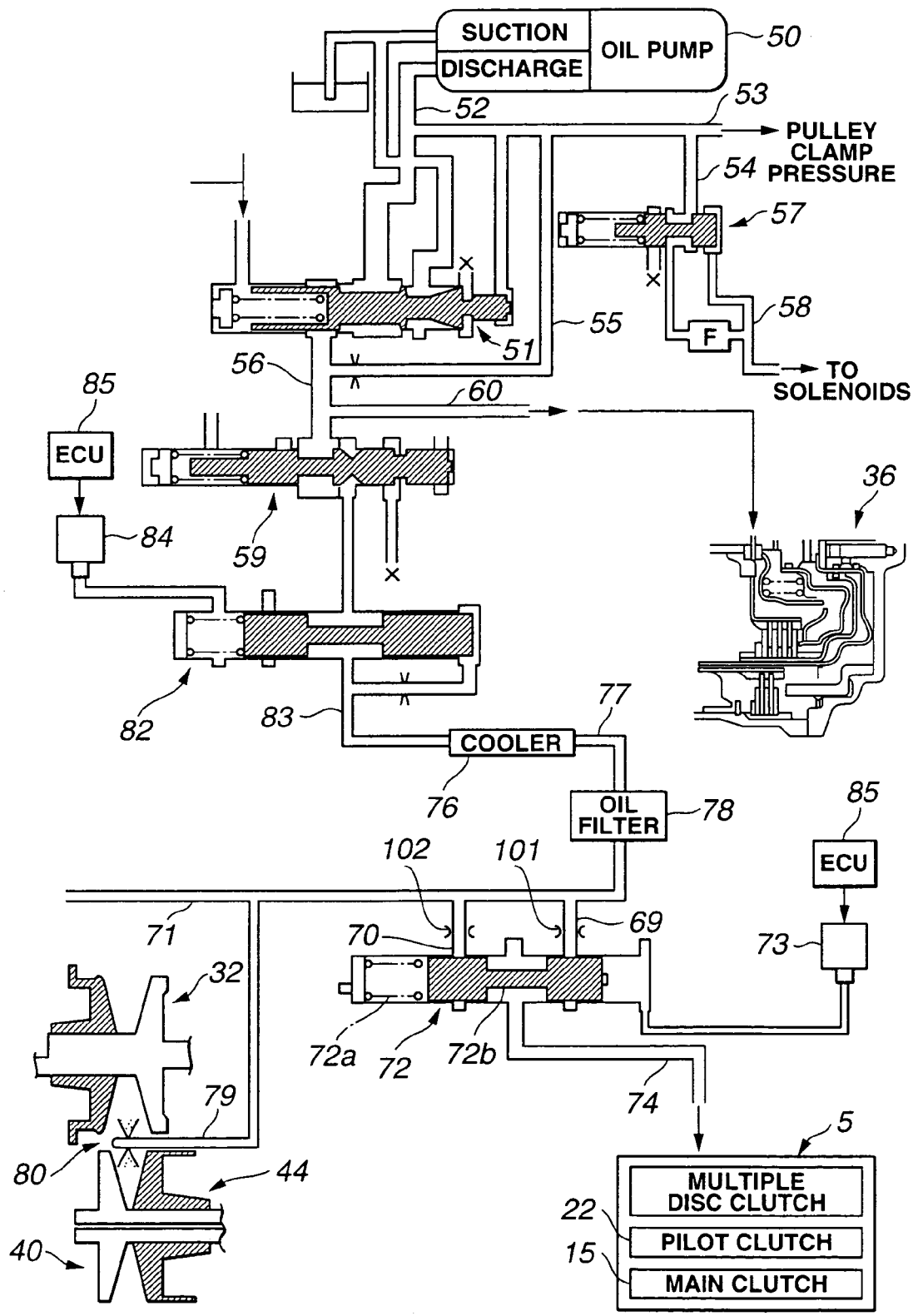
FIG. 2 is a diagram showing a hydraulic circuit of a V-belt type CVD.

Referring to FIG. 2, a hydraulic circuit of the V-belt type CVD 40 comprises a pressure regulator valve 51 for regulating the discharge pressure of an oil pump 50 supplied through a hydraulic passage 52 so as to serve as line pressure or pulley-clamp pressure. The hydraulic passage 52 communicates with a hydraulic passage 53. The hydraulic passage 53 serves as a pulley-clamp-pressure supply passage for supplying the pulley-clamp pressure to the CVD 40. A hydraulic passage 54 communicating with the hydraulic passage 53 serves to supply the source pressure of a pilot valve 57.

Lubricating oil drained through the pressure regulator valve 51 is delivered to a lubrication-pressure-control pressure regulator valve 82 through a hydraulic passage 56. In accordance with a command of an electronic control unit (ECU) 85, a solenoid or pressure controller 84 provides signal pressure to the pressure regulator valve 82, thereby carrying out lubrication-flow control. This lubrication-flow control allows adjustment of the lubrication flow in proportion to the signal pressure out of the solenoid 84. Lubricating oil having the pressure regulated by the pressure regulator valve 82 is cooled down when passing through an oil cooler 76 via a hydraulic passage 83.

The hydraulic passage 56 communicates with a hydraulic passage 55 branched off from the hydraulic passage 53 for supplying the pulley-clamp pressure. The hydraulic pressure within the hydraulic passage 55 is reduced through an orifice, which is supplied to the hydraulic passage 56. A clutch regulator valve 59 is connected to the hydraulic passage 56 so as to adjust the hydraulic pressure within hydraulic passages 56, 60. The hydraulic pressure within the hydraulic passage 60 is supplied to a piston chamber of the forward clutch 36.

Cooled lubricating oil is injected from a belt lubricating-oil supply nozzle 80 through a hydraulic passage 77, an oil filter 78, and a hydraulic passage 79, carrying out belt lubrication of the CVD 40. Moreover, cooled lubricating oil is fed to various parts such as differential gear for lubrication through the oil filter 78 and a hydraulic passage 71, which is then returned to the oil pan. Further, cooled lubricating oil is fed to the main clutch 15 and pilot clutch 22 of the multiple disc clutch 5 through the oil filter 78 and hydraulic passages 69, 70.

The hydraulic passage 69 and the hydraulic passage 70 are provided with a large orifice 101 and a small orifice 102, respectively, and are connected to a lubrication-distribution-control switching valve 72. The switching valve 72 comprises a return spring 72a and a spool valve 72b. The spool valve 72b undergoes on the opposite side of the return spring 72a a signal pressure Psig out of a lubrication-control three-way duty solenoid or distribution controller 73.

In accordance with a command of the ECU 85, a pilot pressure Pp is changed by the three-way duty solenoid 73 into three signal pressures Psig of 0%, 50% and 100% duty ratios, which serve to control the position of the spool valve 72b against a biasing force of the return spring 72a. Thus, the lubrication-distribution-control switching valve 72 is controlled positionally, allowing lubrication control.

Figure 3:
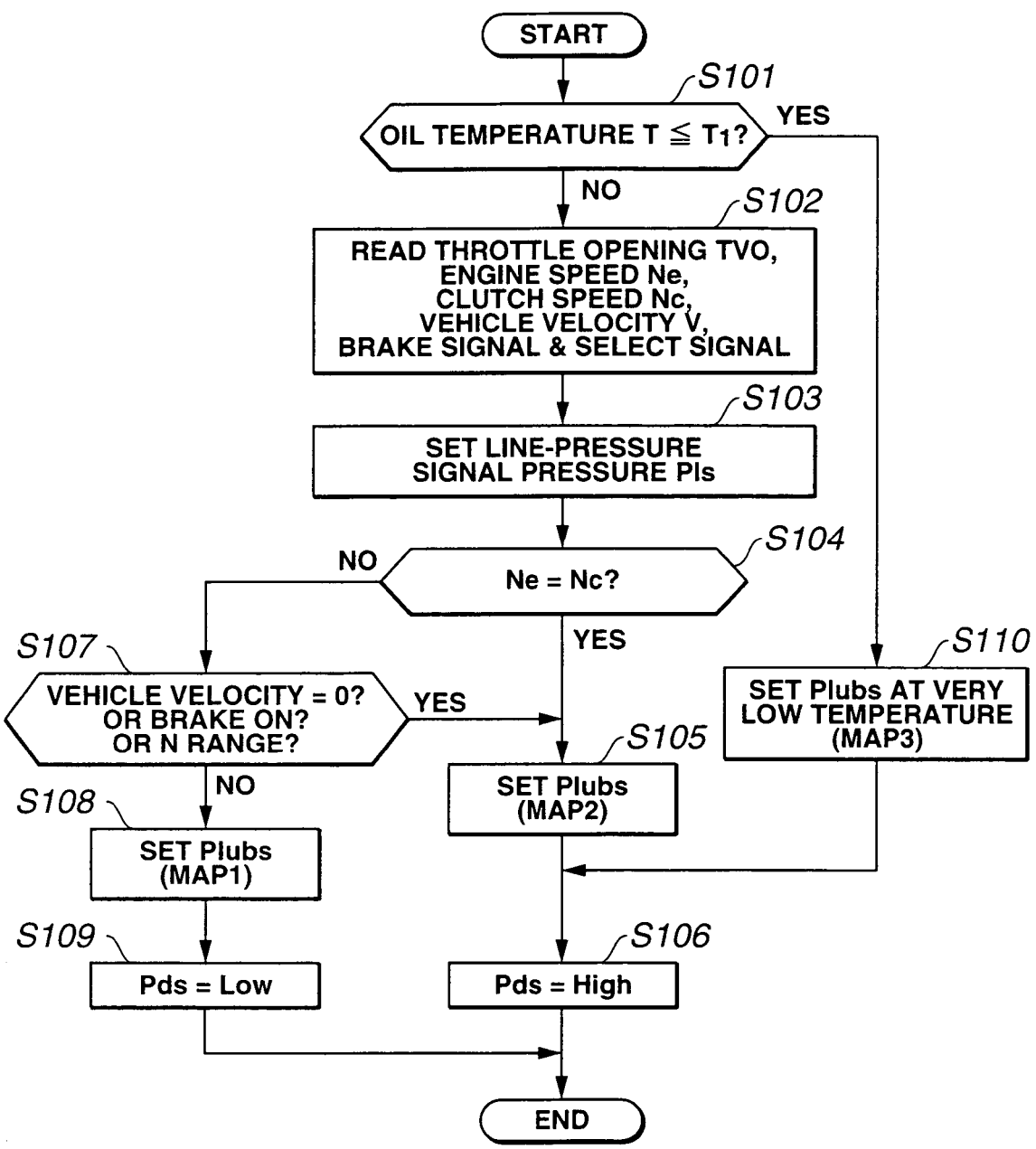
FIG. 3 is a flow chart showing operation of the first embodiment.

Referring to FIG. 3, operation of the first embodiment will be described.

At a step S101, it is determined whether or not an oil temperature T is equal to or smaller than a very low temperature $T_1$. If it is determined that oil temperature T≦very low temperature $T_1$, flow proceeds to a step S110, whereas if it is determined that temperature T>very low temperature $T_1$, flow proceeds to a step S102.

At the step S102, it is read a throttle opening TVO, an engine speed Ne, a clutch speed Nc, a vehicle velocity V, a brake signal, and a select signal. Then, flow proceeds to a step S103.

At the step S103, it is set a line-pressure signal pressure Pls. Then, flow proceeds to a step S104.

At the step S104, it is determined whether or not the engine speed Ne is equal to the clutch speed Nc. If it is determined that engine speed Ne=clutch speed Nc, flow proceeds to a step S105, whereas if it is determined that engine speed Ne≠clutch speed Nc, flow proceeds to a step S107.

Figure 4:
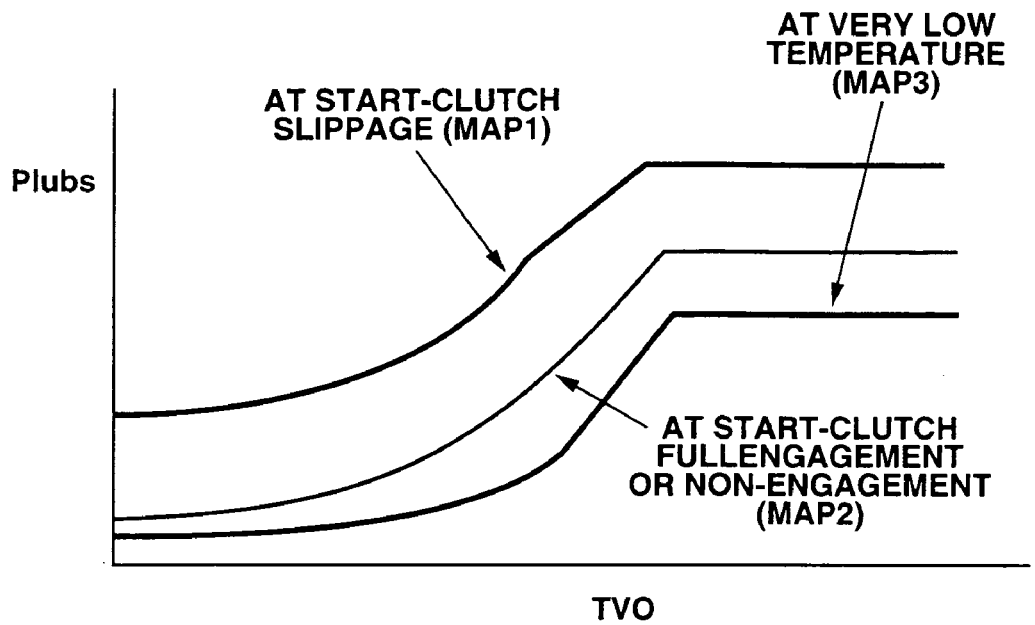
FIG. 4 is a graph illustrating the relationship between a lubrication-pressure signal pressure and a throttle opening.

At the step S105, a lubrication-pressure signal pressure Plubs for controlling the lubrication-pressure-control pressure regulator valve 82 is set in accordance with a map MAP2 (refer to FIG. 4). Then, flow proceeds to a step S106.

Figure 5:
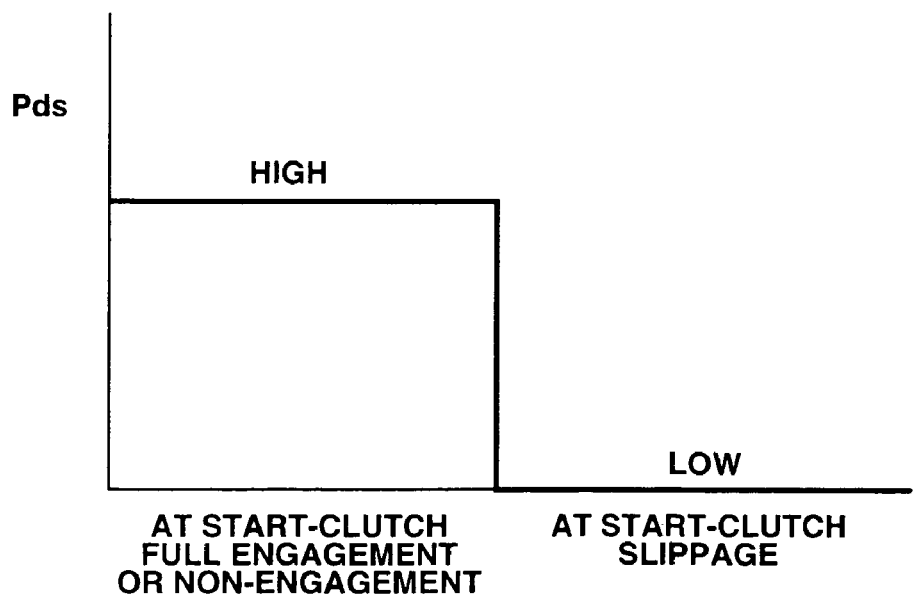
FIG. 5 is a graph illustrating the relationship between a distribution signal pressure and a start-clutch state.

At the step S106, a distribution signal pressure Pds is set at High (refer to FIG. 5). Then, flow comes to an end.

At the step S107, it is determined whether or not any of the following conditions is met: the vehicle velocity is zero, the brake is ON, and the selected range is N range. If it is determined that any of the conditions is met, flow proceeds to the step S105, whereas if it is determined that no condition is met, flow proceeds to a step S108.

At the step S108, the lubrication-pressure signal pressure Plubs is set in accordance with a map MAP1 (refer to FIG. 4). Then, flow proceeds to a step S109.

At the step S109, the distribution signal pressure Pds is set at Low (refer to FIG. 5). Then, flow comes to an end.

At the step S110, the lubrication-pressure signal pressure Plubs at very low temperature is set in accordance with a map MAP3 (refer to FIG. 4). Then, flow proceeds to the step S106.

Figure 6A:
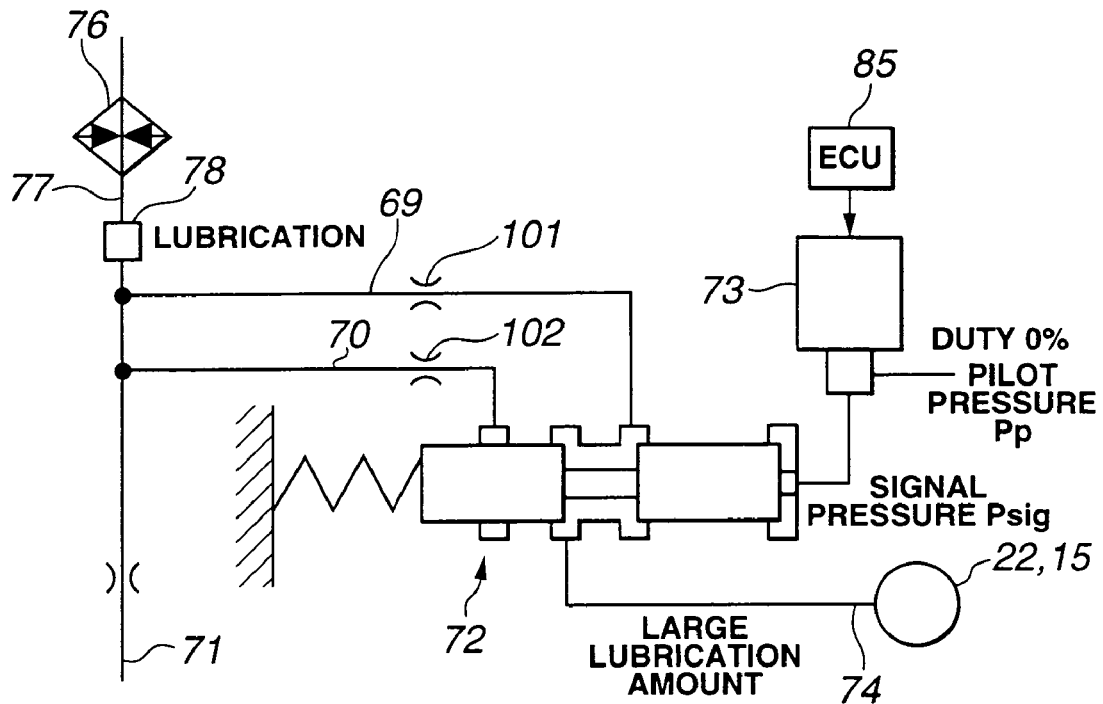
FIGS. 6A and 6B are schematic views showing lubrication switching operation of a lubrication-distribution-control switching valve.
Figure 6B:
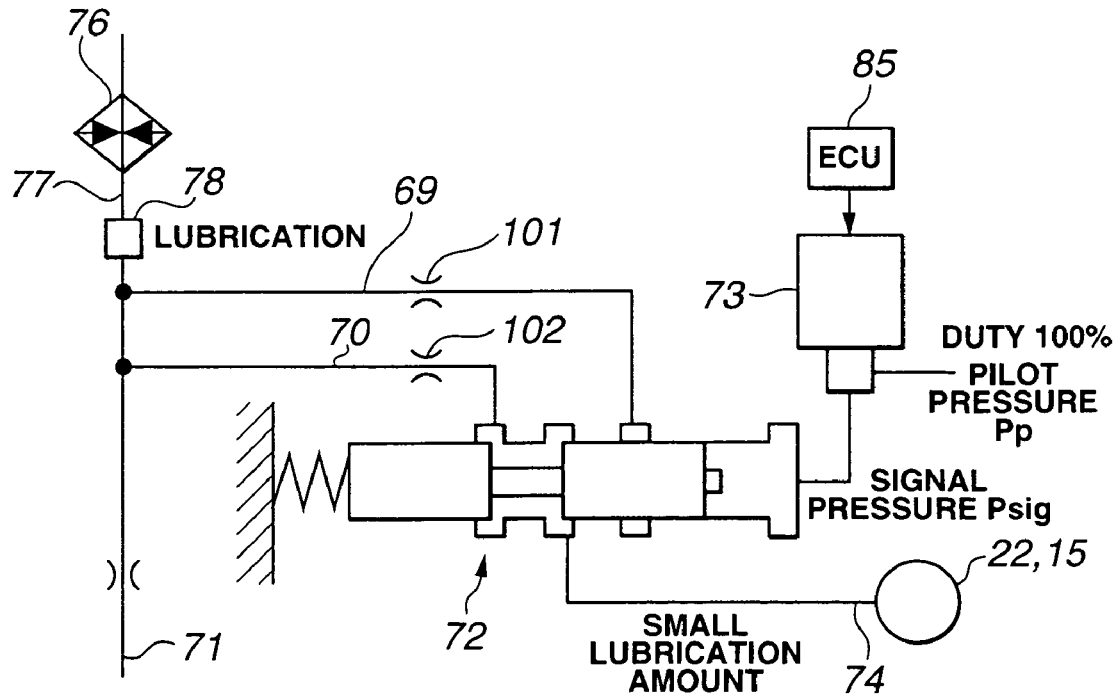

Referring to FIGS. 6A and 6B, a description will be made about lubrication switching operation of the lubrication-distribution-control switching valve 72. Referring to FIG. 6A, the three-way duty solenoid 73 provides distribution signal pressure Pds equal to Low, wherein the switching valve 72 provides fluid communication between the hydraulic passage 69 having large orifice 101 and a hydraulic passage 74, and interrupts fluid communication between the hydraulic passage 70 having small orifice 102 and the hydraulic passage 74. Thus, lubricating oil flowing into the hydraulic passage 74 is of a large lubrication amount, allowing large-amount supply of lubricating oil to the main clutch 15 and the pilot clutch 22.

Referring to FIG. 6B, the three-way duty solenoid 73 provides distribution signal pressure Pds equal to High, wherein the switching valve 72 interrupts fluid communication between the hydraulic passage 69 having large orifice 101 and the hydraulic passage 74, and provides fluid communication between the hydraulic passage 70 having small orifice 102 and the hydraulic passage 74. Thus, lubricating oil flowing into the hydraulic passage 74 is of a small lubrication amount, allowing small-amount supply of lubricating oil to the main clutch 15 and the pilot clutch 22.

A description will be made about lubrication flow-rate control and lubrication switching control ensured by the above structure in connection with three situations.

1) At Very Low Temperature and Vehicle Standstill

Lubrication flow-rate control: When the oil temperature T is very low, i.e. it is determined at the step S101 in FIG. 3 that oil temperature T≦very low temperature $T_1$, flow proceeds to the step S100 where the lubrication flow rate is determined in accordance with the map MAP3 shown in FIG. 4. At very low temperature, the lubrication flow rate is set at a smaller value to increase the oil temperature T.

Lubrication switching control: Since it is determined that the oil temperature T is very low, a command is provided to the three-way duty solenoid 73 so as to set the distribution signal pressure Pds at High, ensuring small lubrication to various clutch plates through the small orifice 102. This allows further acceleration of increase in oil temperature at the clutch plates.

2) At T>$T_1$ and full engagement

Lubrication flow-rate control: Since it is determined at the step S101 in FIG. 3 that oil temperature T>very low temperature $T_1$, flow proceeds to the step S102 where it is read throttle opening TVO, engine speed Ne, clutch speed Nc, vehicle velocity V, brake signal, and select signal. Then, flow proceeds to the step S103 where it is set line-pressure signal pressure Pls. At the subsequent step S104, if it is determined that the electromagnetic multiple disc clutch 5 is in full engagement, flow proceeds to the step S105 where the lubrication flow rate is determined in accordance with the map MAP2 shown in FIG. 4.

Lubrication switching control: A command is provided to the three-way duty solenoid 73 so as to set the distribution signal pressure Pds at High, ensuring small lubrication to various clutch plates through the small orifice 102.

3) At T>$T_1$ and Slippage

Lubrication flow-rate control: Since it is determined at the step S101 in FIG. 3 that oil temperature T>very low temperature $T_1$, flow proceeds to the step S102 where it is read throttle opening TVO, engine speed Ne, clutch speed Nc, vehicle velocity V, brake signal, and select signal. Then, flow proceeds to the step S103 where it is set line-pressure signal pressure Pls. At the subsequent step S104, if it is determined that the electromagnetic multiple disc clutch 5 is in slippage or non-engagement, flow proceeds to the step S107 where it is determined whether or not the vehicle is at a standstill. If it is determined that the multiple disc clutch 5 is in slippage, flow proceeds to the step S108 where the lubrication flow rate is determined in accordance with the map MAP1 shown in FIG. 4. On the other hand, if it is determined that the vehicle is at a standstill, flow proceeds to the step S105 for full engagement as described above, where the lubrication flow rate is determined in accordance with the map MAP2 shown in FIG. 4.

Lubrication switching control: A command is provided to the three-way duty solenoid 73 so as to set the distribution signal pressure Pds at Low, ensuring large lubrication to various clutch plates through the large orifice 101.

As described above, in the first embodiment, the oil cooler 76 for cooling down lubricating oil is arranged with a upstream portion of the hydraulic passage 77 for feeding lubricating oil to the wet clutch including forward clutch 36 and electromagnetic multiple disc clutch 5 and various lubrication points. This allows supply of cooled lubricating oil, leading to enhanced cooling efficiency of the whole transmission unit due to oil cooling effect.

Further, the lubrication-pressure-control pressure regulator valve 82 is arranged upstream of the oil cooler 76. Generally speaking, when the engine speed Ne is lower, the lubrication flow rate is reduced accordingly. In the first embodiment, even when the engine speed Ne is lower, the pressure regulator valve 82 allows supply of required lubrication amount. Moreover, the pressure regulator valve 82 ensures setting of the lubrication pressure in consideration of the line resistance when feeding lubricating oil through the oil cooler 76, allowing supply of required lubrication amount.

Still further, when the oil temperature T is lower than a set low temperature, a lubrication-pressure command is provided which indicates lower lubrication pressure than a predetermined pressure given in accordance with the map MAP3. This allows adjustment of the flow rate at a smaller value when no cooling is needed, leading to increase in oil temperature T to the adequate range.

Furthermore, when it is determined that the electromagnetic multiple disc clutch 5 is in slippage, the lubrication flow rate can be increased by raising the lubrication pressure. This allows not only sure prevention of heat generation resulting from slippage, but also enhancement in durability of the main clutch 15 and the pilot clutch 22. Optionally, lubrication-flow-rate control of the forward clutch 36 and the like may be carried out in accordance with slippage of the wet clutch such as forward clutch 36 in place of slippage of the multiple disc clutch 5.

Further, the lubrication-distribution-control switching valve 72 is arranged which can distribute lubricating oil downstream of the oil cooler 76. This allows distribution of the lubrication flow rate among various points to be lubricated.

Further, the lubricating-oil distribution ratio can be switched between at least two values, resulting in achievement of finer distribution of the lubrication flow rate among various points to be lubricated.

Still further, a command is provided to the lubrication-distribution-control switching valve 72 in accordance with engagement of the electromagnetic multiple disc clutch 5, allowing distribution control in accordance with engagement of the multiple disc clutch 5. It is noted that the multiple disc clutch 5 produces greater heat amount when generating creep torque by slip control. In the first embodiment, active control of the lubrication amount allows not only prevention of heat generation of the main clutch 15 and the pilot clutch 22, but also enhancement in durability thereof.

Furthermore, by way of example, the lubrication pressure of the lubrication-pressure-control pressure regulator valve 82 is set at a higher value, whereas the lubrication amount of the lubrication-distribution-control switching valve 72 is set at a smaller value, allowing an increase in lubrication amount for other parts than the electromagnetic multiple disc clutch 5, such as belt slide portion, differential gear, and forward clutch 36. Specifically, combined control of the pressure regulator valve 82 and the switching valve 72 allows control of the lubrication amount for other lubrication points than the multiple disc clutch 5.

Figure 7:
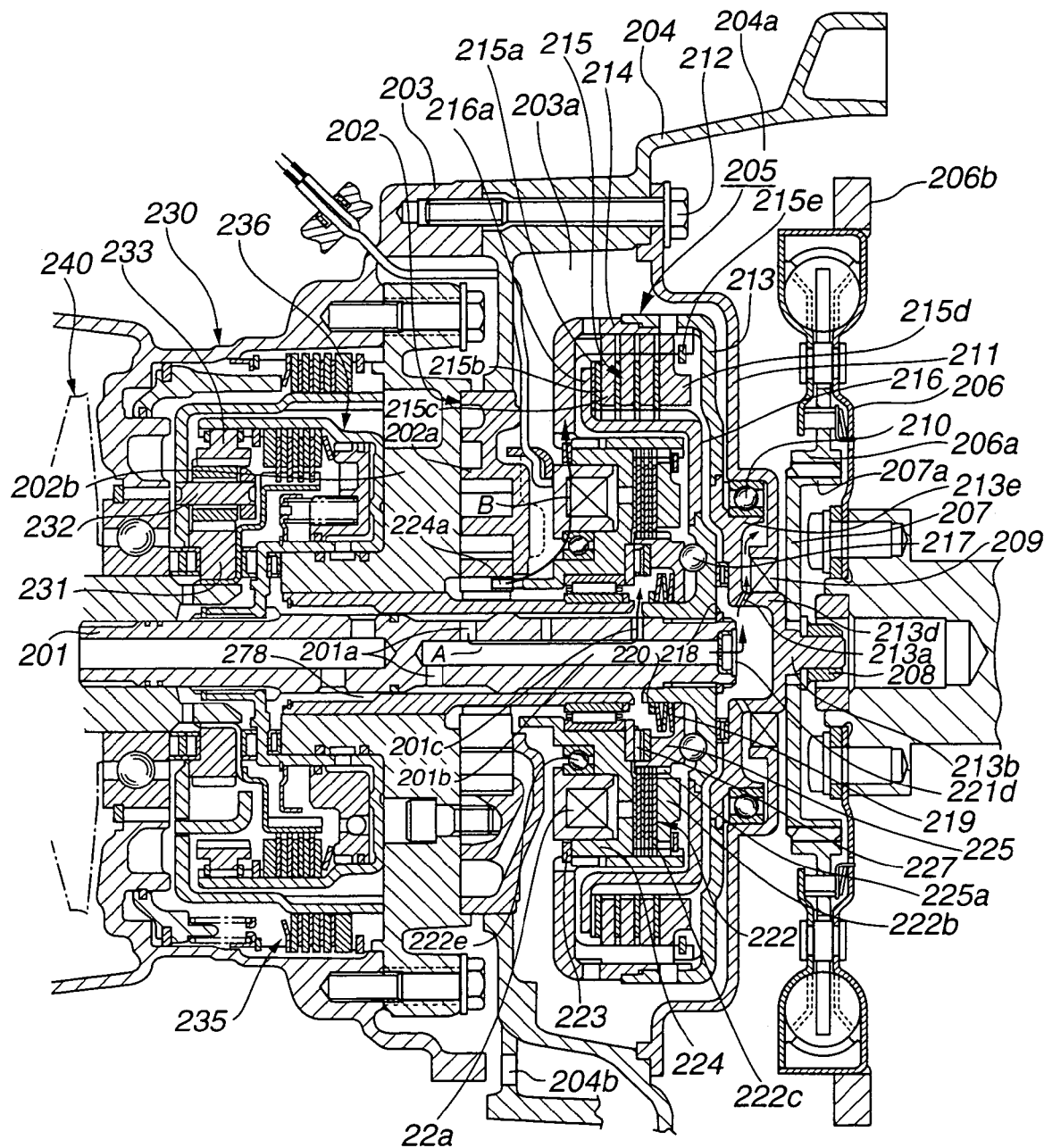
FIG. 7 is a view similar to FIG. 1, showing a second embodiment of the present invention.

Referring to FIGS. 7–12, there is shown second embodiment of the present invention. Referring to FIG. 7, a transmission unit to which the second embodiment is applied comprises an electromagnetic multiple disc clutch or wet clutch 205 and a forward/reverse switching mechanism 230. Output torque of an engine, not shown, is provided to a V-belt type CVD 240 through the multiple disc clutch 205 and the forward/reverse switching mechanism 230. The forward/reverse switching mechanism 230 comprises a planetary-gear set comprising a sun gear 231 rotating together with an input shaft of the CVT 240, a pinion carrier 232, and a ring gear 233 rotating together with an input shaft 201, a reverse brake 235 for fixing the pinion carrier 232 to a transmission casing 203, and a forward clutch 236 for engaging the sun gear 231 and the ring gear 233. A description about the CVT 240 is left out, since its structure is commonly known in the art.

The electromagnetic multiple disc clutch 205 will be described in detail. Referring to FIG. 7, an input-clutch housing 204 is mounted to the transmission casing 203 at a front-end opening thereof. A front cover 211 is attached to the input-clutch housing 204 by a bolt 212, thereby defining a first accommodation chamber 204a opening into the atmosphere and serving to accommodate a torsional damper 206. The transmission casing 203, part of the input-clutch housing 204, and the front cover 211 cooperate with each other to define a second accommodation chamber 203a subjected to oil lubrication.

An oil pump 202 is interposed between the transmission casing 203 and the input-clutch housing 204. The oil pump 202 includes an ordinary gear pump constructed by accommodating an internal-gear-pump element in a space defined by a pump housing 202a and a pump cover 202b. A stationary hollow sleeve 202c is engaged on the inner periphery of the pump cover 202b to rotatably fit the input shaft 201 therein.

The electromagnetic multiple disc clutch 205 is disposed on a front end of the input shaft 201 protruding in the input-clutch housing 204. The multiple disc clutch 205 comprises a pilot clutch 222, a main clutch 215 disposed on the outer periphery of the pilot clutch 222, and a loading cam 217 disposed on the inner periphery of the pilot clutch 222.

An input drum 213 of the main clutch 215 comprises a shank 213b for fixing an input hub 207 by a nut 208, a small-diameter shaft 213d serving as a slide portion with an oil seal 209, and a bearing support 213e for supporting the input drum 213 by the front cover 211 through a bearing 210.

Power of the engine is transferred to input drums 213, 214 of the main clutch 215, i.e. the drive side, through the torsional damper 206 integrated with a drive plate 206b and the input hub 207. The power transfer parts include input hub 207 fixed to the input drum 213 which rotates together with an output member 206a of the torsional damper 206, input drum 214 splined to the input drum 213, and a rotor 224 of the pilot clutch 222 engaged with the input drum 214 for unitary rotation. One end 224a of the rotor 224 is formed with a drive pawl of the oil pump 22.

When electromagnetic force is generated in an electromagnet 222a to attract a retaining plate 222b and a metal plate 222c to thereby cause engagement of the pilot clutch 222, engine rotation is input to the loading cam 217. By the cam action of the loading cam 217 obtained by a ball rolling on the inclined surface, thrust force is generated in a main clutch hub 216, i.e. the driven side. On the other hand, thrust force as reaction force acts on the input drum 214, the rotor 224, and the electromagnet 222a through a thrust bearing 227 against a return disc spring 219 held by a snap ring 220.

The main clutch hub 216 is splined to the input shaft 201. With the input drum 214 of the main clutch 215 shifted leftward, a clutch plate 215c is engaged with the main clutch 215 for unitary rotation. The main clutch hub 216 is engaged with a facing plate 215b having a friction-material facing bonded on both sides for unitary rotation. The clutch plate 215c and the facing plate 215b are disposed axially alternately.

Lubrication of the electromagnetic multiple disc clutch 205 will be described. By the centrifugal-pump action, lubricating oil derived from a control-valve circuit, not shown, is fed to the pilot clutch 222 and the main clutch 215 for lubrication through an opening 201a, a hollow 201b, and an opening 201c of the input shaft 201 as indicated by arrow A in FIG. 7. The input drums 213, 214 are formed with a plurality of openings, not shown, through which lubricating oil is transferred and accumulated in a space hermetically enclosed by the front cover 211 and the clutch housing 204, then returned to an oil pan, not shown, arranged in the transmission casing 203 through a drain port 204b which opens at a lower end of the clutch housing 204.

Moreover, lubricating oil is fed to the rotor 224 and a bearing 222e for lubrication and also to the electromagnet 222a for cooling as indicated by arrow B in FIG. 7 through a lubrication passage arranged in the vicinity of the oil-pump drive pawl 224a of the rotor 224. In such a way, lubrication of the pilot clutch 222 and the clutch plate 215c of the main clutch 215 and that of the bearing 222e and the electromagnet 222a are ensured by different lubrication systems.

Figure 8:
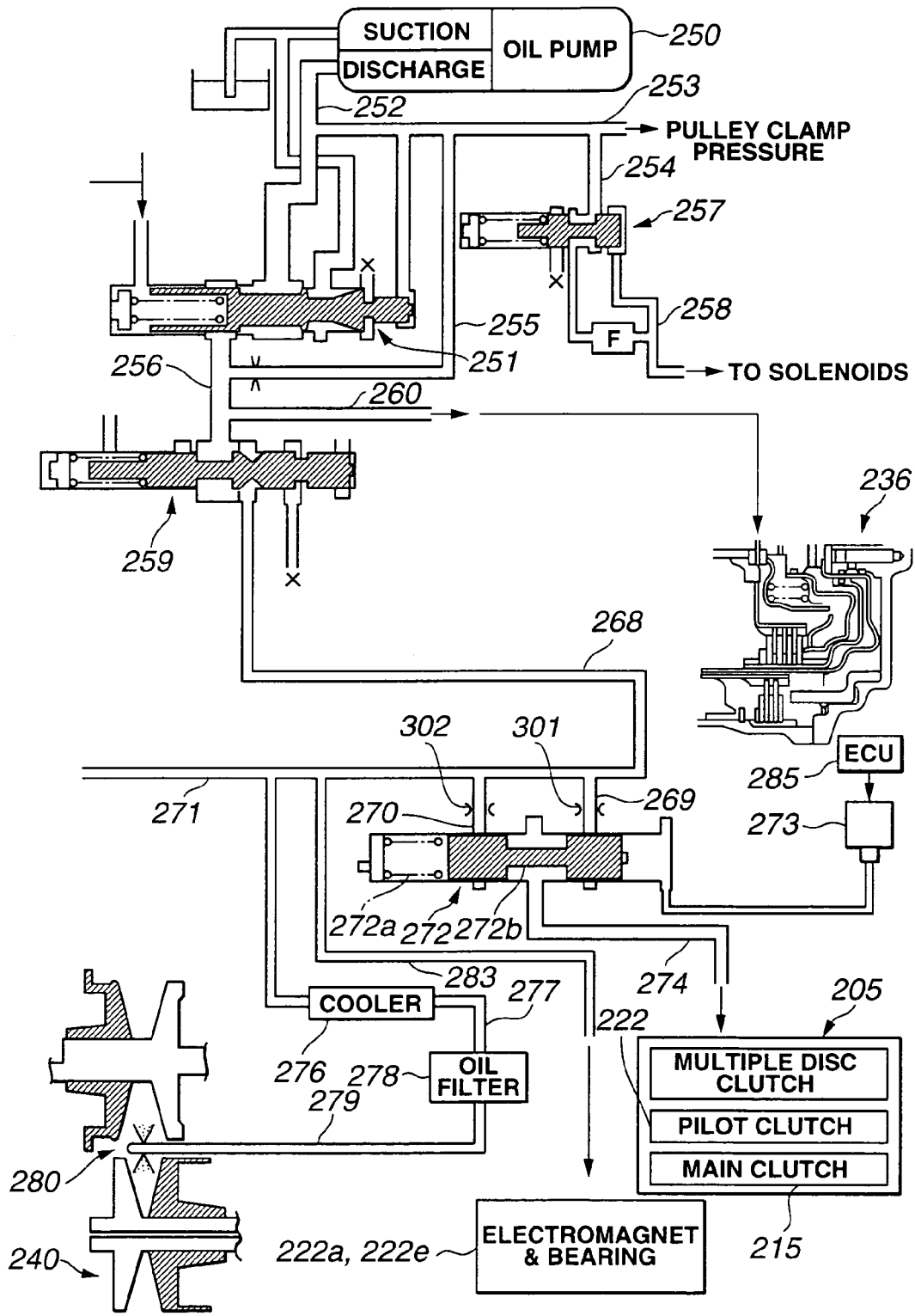
FIG. 8 is a diagram similar to FIG. 2, showing a hydraulic circuit of a V-belt type CVD in FIG. 7.

Referring to FIG. 8, a hydraulic circuit of the V-belt type CVD 240 comprises a pressure regulator valve 251 for regulating the discharge pressure of an oil pump 250 supplied through a hydraulic passage 252 so as to serve as line pressure or pulley-clamp pressure. The hydraulic passage 252 communicates with a hydraulic passage 253. The hydraulic passage 253 serves as a pulley-clamp-pressure supply passage for supplying the pulley-clamp pressure to the CVD 240. A hydraulic passage 254 communicating with the hydraulic passage 253 serves to supply the source pressure of a pilot valve 257.

Lubricating oil drained through the pressure regulator valve 251 is delivered to a clutch regulator valve 259 through a hydraulic passage 256. Lubricating oil drained through the clutch regulator valve 259 is delivered to a hydraulic passage 268, then to hydraulic passages 269, 270 for supplying lubricating oil to the main clutch 215 and pilot clutch 222 of the electromagnetic multiple disc clutch 205. The hydraulic passage 268 communicates with a hydraulic passage 271 for supplying lubricating oil to a differential gear, not shown, a hydraulic passage 279 for supplying lubricating oil to a contact face between the belt and the pulley of the CVD 240 through an oil cooler 276, and a hydraulic passage 283 for supplying lubricating oil to the electromagnet 222a and bearing 222e of the multiple disc clutch 205.

The clutch regulator valve 259 serves to adjust the hydraulic pressure within the hydraulic passages 256, 260. The hydraulic pressure within the hydraulic passage 260 is supplied to a piston chamber of the forward clutch 236.

The hydraulic passages 269, 270 are connected to a lubrication-distribution-control switching valve 272. The switching valve 272 serves to switch fluid communication between the hydraulic passages 269, 270 and an electromagnetic-multiple-disc-clutch lubrication circuit 274 in accordance with a signal pressure Psig out of a three-way duty solenoid or distribution controller 273.

Figure 9A:
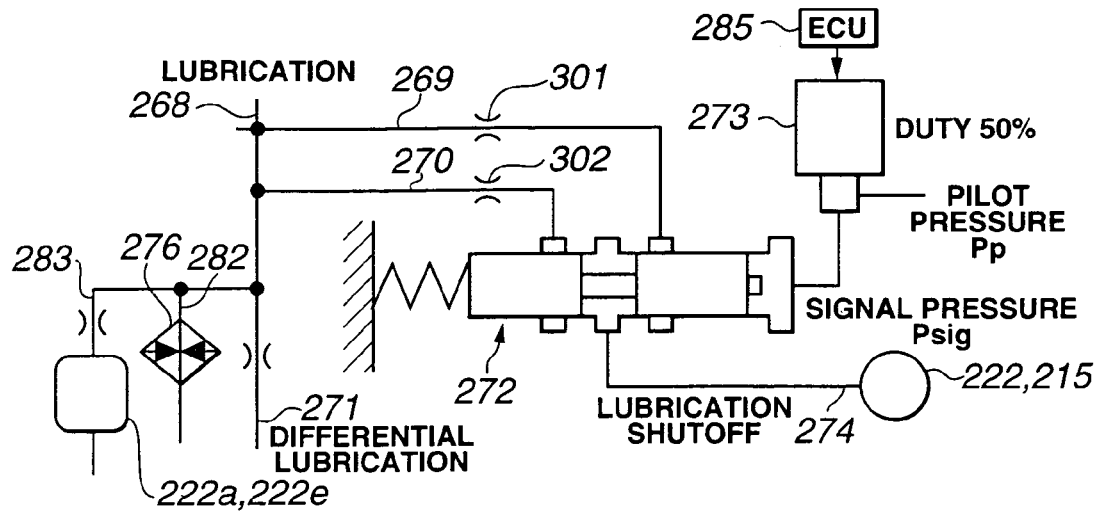
FIGS. 9A–9C are views similar to FIG. 6B, showing lubrication switching operation of a lubrication-distribution-control switching valve in FIG. 8.
Figure 9B:
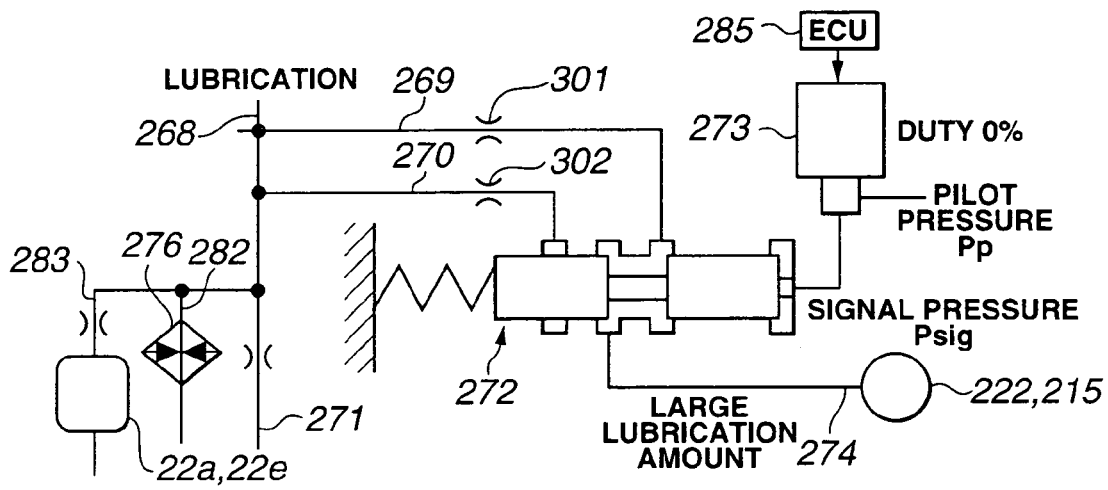
Figure 9C:
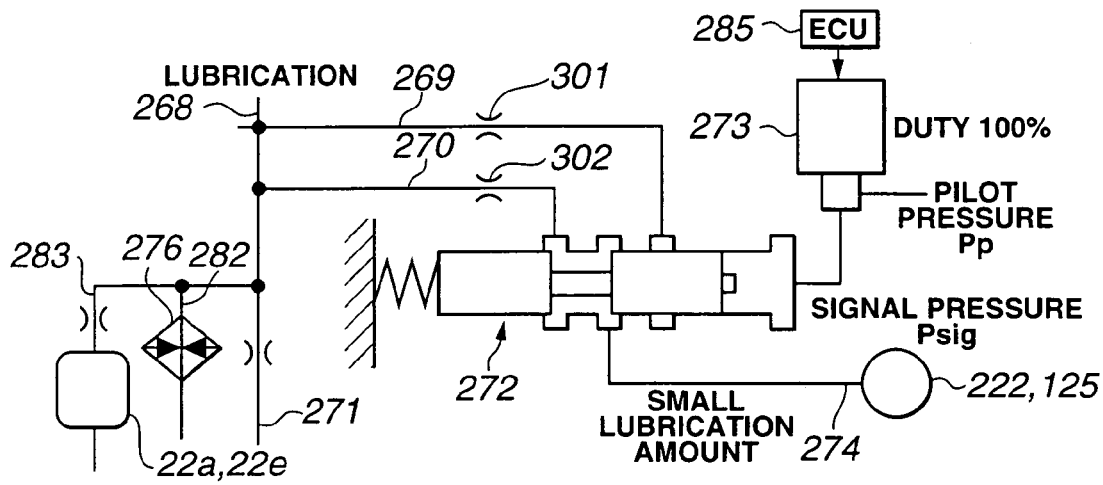

Referring to FIGS. 9A–9C, a description will be made about lubrication switching operation of the lubrication-distribution-control switching valve 272. There are two lubrication systems: first lubrication system for the electromagnet 222a and the bearing 222e and second lubrication system for the main clutch 215 and the pilot clutch 222.

The clutch regulator valve 259 creates hydraulic pressure lower than that produced by the pressure regulator valve 251. Lubricating oil drained through the clutch regulator valve 259 is delivered to the hydraulic passages 269, 270.

The hydraulic passage 269 and the hydraulic passage 270 are provided with a large orifice 301 and a small orifice 302, respectively. In accordance with a command of an electronic control unit (ECU) 285, the three-way duty solenoid 273 changes a pilot pressure Pp into three signal pressures Psig of 0%, 50% and 100% duty ratios, which allows control of the lubrication-distribution-control switching valve 272, ensuring lubrication control.

Referring to FIG. 9A, the three-way duty solenoid 273 is of 50% duty ratio, wherein the lubrication-distribution-control switching valve 272 interrupts fluid communication between the hydraulic passage 269 having large orifice 301 and the hydraulic passage 270 having small orifice 302 and electromagnetic-multiple-disc-clutch lubrication circuit 274. Thus, lubricating oil is not supplied to the main clutch 215 and the pilot clutch 222.

Referring to FIG. 9B, the three-way duty solenoid 273 is of 0% duty ratio, wherein the switching valve 272 provides fluid communication between the hydraulic passage 269 having large orifice 301 and the lubrication circuit 274. Thus, lubricating oil flowing into the lubrication circuit 274 is of a large lubrication amount, allowing large-amount supply of lubricating oil to the main clutch 215 and the pilot clutch 222.

Referring to FIG. 9C, the three-way duty solenoid 273 is of 100% duty ratio, wherein the switching valve 272 interrupts fluid communication between the hydraulic passage 269 having large orifice 301 and the lubrication circuit 274, and provides fluid communication between the hydraulic passage 270 having small orifice 302 and the lubrication circuit 274. Thus, lubricating oil flowing into the hydraulic passage 274 is of a small lubrication amount, allowing small-amount supply of lubricating oil to the main clutch 215 and the pilot clutch 222.

Figure 10:
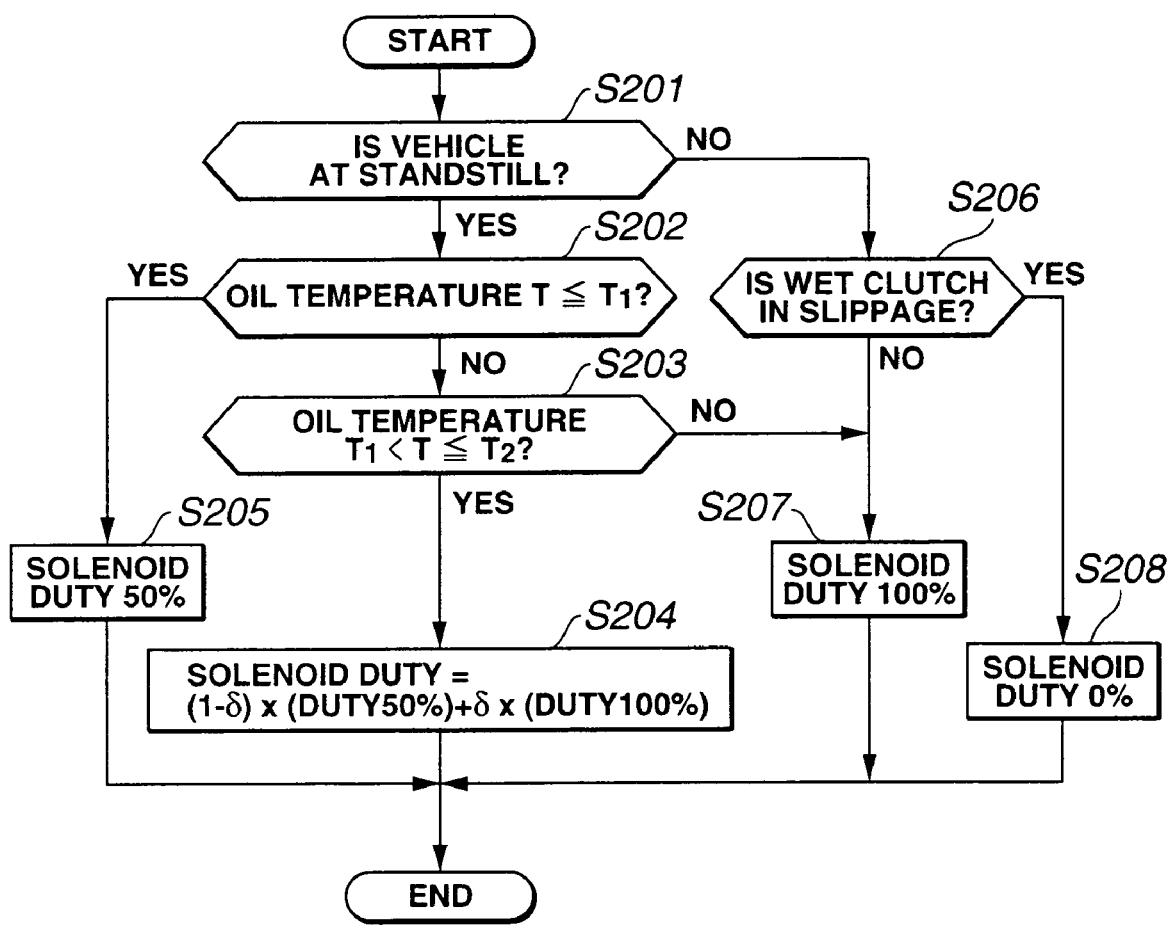
FIG. 10 is a chart similar to FIG. 3, illustrating operation of the second embodiment.

Referring to FIG. 10, operation of the second embodiment will be described.

At a step S201, it is determined whether or not the vehicle is at a standstill. If it is determined that the vehicle is at a standstill, flow proceeds to a step S202, whereas if it is determined that the vehicle is not at a standstill, flow proceeds to a step S206.

At the step S202, it is determined whether or not an oil temperature T is equal to or smaller than a first predetermined temperature $T_1$. If it is determined that oil temperature $T \leq$ first predetermined temperature $T_1$, flow proceeds to a step S205, whereas if it is determined that temperature T>first predetermined temperature $T_1$, flow proceeds to a step S203.

At the step S203, it is determined whether or not the oil temperature T is equal to or smaller than a second predetermined temperature $T_2$. If it is determined that oil temperature $T \leq$ second predetermined temperature $T_2$, flow proceeds to a step S204, whereas if it is determined that temperature T>second predetermined temperature $T_2$, flow proceeds to a step S207.

Figure 12:
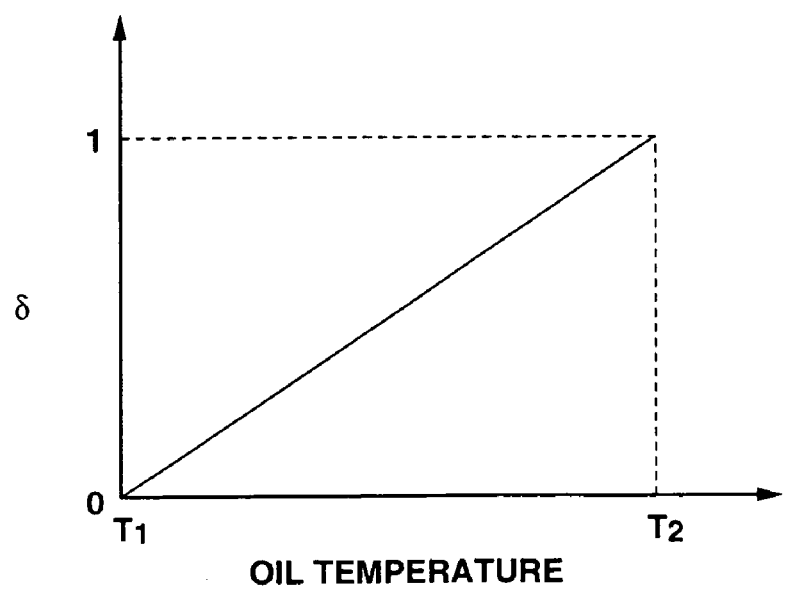
FIG. 12 is a graph similar to FIG. 11, illustrating a variation in adjustment factor δ when the oil temperature is within the range of $T_1$ to $T_2$.

At the step S204, referring to FIG. 12, an adjustment factor δ is calculated in accordance with the oil temperature T. The three-way duty solenoid 273 ensures duty control based on the duty ratio calculated by the following equation:

duty ratio=(1−δ)×(50% duty ratio)+δ×(100% duty ratio)

At the step S205, the duty ratio of the three-way duty solenoid 273 is set at 50%. Then, flow comes to an end.

At the step S206, it is determined whether or not the electromagnetic multiple disc clutch 205 is in slippage. If it is determined that the disc clutch 205 is in slippage, flow proceeds to a step S208, whereas if it is determined that the disc clutch 205 is not in slippage, flow proceeds to the step S207.

At the step S207, the duty ratio of the three-way duty solenoid 273 is set at 100%. Then, flow comes to an end.

At the step S208, the duty ratio of the three-way duty solenoid 273 is set at 0%. Then, flow comes to an end.

Figure 11:
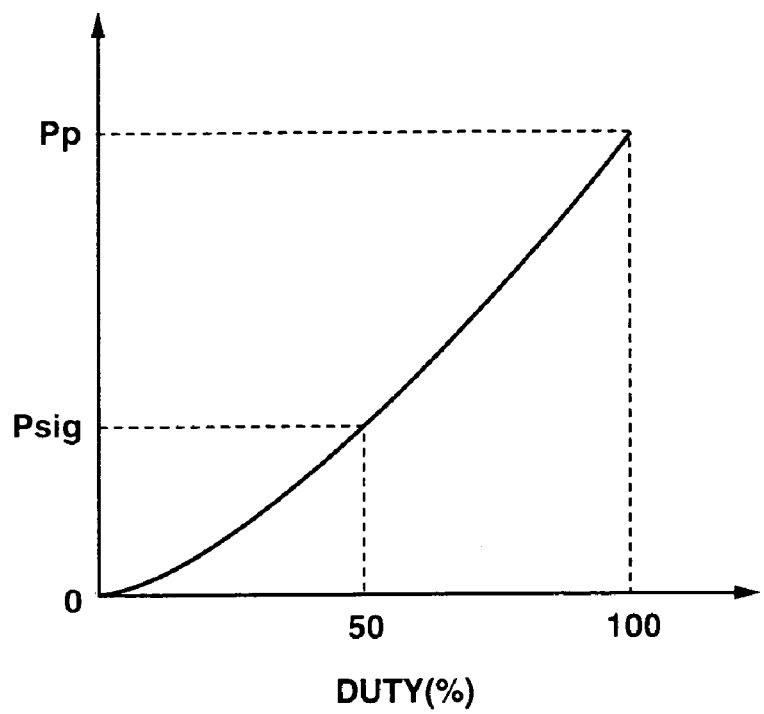
FIG. 11 is a graph similar to FIG. 5, illustrating a variation in signal pressure in accordance with the duty ratio.

Referring to FIG. 11, there is shown a variation in the signal pressure Psig in accordance with the duty ratio. As is seen from FIG. 11, when the duty ratio is 100%, the pilot pressure Pp is provided as 100% signal pressure Psig, while the signal pressure Psig is reduced with reducing the duty ratio.

Referring to FIG. 12, there is shown a variation in the adjustment factor δ when the oil temperature T is between the first predetermined temperature $T_1$ and the second predetermined temperature $T_2$. In the equation given at the step S204 in FIG. 10, as the oil temperature T is close to second predetermined temperature $T_2$, the adjustment factor δ is close to 1, and thus the duty ratio of the three-way duty solenoid 273 is close to 100%, providing small lubrication amount. Moreover, as the oil temperature T is close to first predetermined temperature $T_1$, the adjustment factor δ is close to 0, and thus the duty ratio of the three-way duty solenoid 273 is close to 50%, producing shutoff of lubrication.

A description will be made about lubrication flow-rate control ensured by the above structure in connection with five situations.

1) At Vehicle Standstill and Very Low Temperature

When it is determined that the vehicle is at a standstill, and the oil temperature T is very low, the duty ratio is set at 50% to shut off lubrication until the oil temperature T rises. This allows an increase in oil temperature T by frictional heat, and prevention of occurrence of engine stop due to drag torque of the electromagnetic multiple disc clutch 205 upon N-D select.

2) At vehicle standstill and $T_1 < T \leq T_2$

When it is determined that the vehicle is at a standstill, and $T_1 < T \leq T_2$, the duty ratio is set based on the adjustment factor δ in accordance with the oil temperature T. This ensures appropriate setting of the supply amount of lubricating oil in accordance with the oil temperature T, and intermittent shutoff of its supply, increasing the oil temperature T by frictional heat generated in the main clutch 215 and the pilot clutch 222.

3) At Vehicle Standstill and $T_2 < T$

When it is determined that the vehicle is at a standstill, and $T_2 < T$, an increase in oil temperature T is not needed, and drag torque is less generated. Thus, the duty ratio is set at 100% to supply a small amount of lubricating oil, allowing preservation of the oil temperature T and achievement of appropriate lubrication.

4) At Vehicle Running and Full Engagement

During full engagement of the electromagnetic multiple disc clutch 205, a small amount of heat is generated in the main clutch 215 and the pilot clutch 222. Thus, the duty ratio is set at 100% to supply a small amount of lubricating oil, allowing preservation of the oil temperature T and achievement of appropriate lubrication.

5) At Vehicle Running and Slippage

Upon slippage of the electromagnetic multiple disc clutch 205, a great amount of heat is generated in the main clutch 215 and the pilot clutch 222. Thus, the duty ratio is set at 0% to supply a great amount of lubricating oil, restraining heating of the clutches 215, 222.

As described above, in the second embodiment, in accordance with a command of the ECU 285, the three-way duty solenoid 273 changes the pilot pressure Pp into signal pressures Psig, according to which the lubrication-distribution-control switching valve 272 carries out lubrication flow-rate control, allowing lubrication flow-rate control in accordance with the vehicle operating conditions.

Further, when the vehicle is at a standstill, and the oil temperature T is low, lubrication is shut off until the oil temperature T rises so as to reduce drag torque due to greater viscosity of lubricating oil, allowing lubrication after increasing the oil temperature T by frictional heat.

Still further, when the vehicle is at a standstill, and the oil temperature T is low, appropriate supply amount of lubricating oil is set in accordance with the oil temperature T, allowing lubrication in increasing the oil temperature T by frictional heat.

Furthermore, when the vehicle is running, and the electromagnetic multiple disc clutch 205 is in full engagement, the multiple disc clutch 205 has less slippage amount, and generates less amount of heat. Then, lubrication is carried out with only a small amount of lubricating oil.

Further, when the vehicle is running, and the electromagnetic multiple disc clutch 205 is in slippage, the multiple disc clutch 205 generates greater amount of heat. Then, lubrication is carried out with a great amount of lubricating oil, allowing restraint of heating of the multiple disc clutch 205.

Specifically, execution of control in accordance with the vehicle operating conditions allows efficient use of lubricating oil, contributing to enhancement in fuel consumption. Particularly, when greater drag torque is generated at the main clutch 215 and the pilot clutch 222 due to very low temperature, it can reduce the engine speed at the N range. And when carrying out N-D select, an engine load is increased in a stroke at low rotation, leading to possible occurrence of engine stop. In the second embodiment, drag torque is reduced quickly at the N range, allowing prevention of occurrence of engine stop upon N-D select.

Still further, there are arranged first lubrication system for ensuring lubrication of the electromagnet 222a and the bearing 222e and second lubrication system for ensuring lubrication of the main clutch 215 and the pilot clutch 222, wherein only the second lubrication system is controlled by the lubrication-distribution-control switching valve 272. Thus, when the vehicle is at a standstill, the electromagnetic multiple disc clutch 205 is not in engagement, so that the electromagnet 222a and the bearing 222e generate less amount of heat, and thus need less lubrication amount. On the other hand, the main clutch 215 and the pilot clutch 222 are in disengagement, and thus can often generate drag torque when the oil temperature T is low, requiring lubrication control in accordance with the oil temperature T. It is noted that lubrication of the electromagnet 222a and the bearing 222e and that of the main clutch 215 and the pilot clutch 222 are controlled based on different concepts. In such a way, lubrication control is carried out in accordance with the purpose, allowing supply of required lubrication amount according to the circumstances, and prevention of needless lubrication. This results not only in optimized balance of the oil amount, but also in enhanced fuel consumption due to reduction in pump load.

As described above, according to the present invention, the system comprises a lubrication passage, a first passage with a large-diameter orifice, and a second passage with a small-diameter orifice, the first and second passages being arranged upstream of the lubrication passage. The switching valve can switch fluid communication between the lubrication passage and the first and second passages into three states including shutoff, resulting in flow-rate control of lubricating oil in accordance with the vehicle operating conditions.

Further, since an oil cooler is arranged on a third passage upstream of the first and second passages, lubricating oil cooled by the oil cooler can be supplied, resulting in enhanced cooling efficiency of the whole transmission unit.

Still further, when the vehicle is at a standstill and that the temperature of lubricating oil is equal to or smaller than a first predetermined temperature, the distribution controller is controlled to control the switching valve so as to shut off fluid communication between the lubrication passage and the first and second passages. This allows quick achievement of increasing the temperature of lubricating oil to an appropriate value by frictional heat.

Still further, when the temperature of lubricating oil is equal to or smaller than a second predetermined temperature which is greater than the first predetermined temperature, a supply ratio of the lubricating oil is calculated in accordance with the temperature. And in accordance with the calculated supply ratio, the distribution controller is controlled to control the switching valve so as to provide intermittent fluid communication between the lubrication passage and the second passage. This allows appropriate supply of lubricating oil in increasing the temperature thereof by frictional heat.

Furthermore, when the temperature of lubricating oil is greater than the second predetermined temperature, the distribution controller is controlled to control the switching valve so as to provide fluid communication between the lubrication passage and the second passage. That is, when the temperature of lubricating oil is within an adequate range, minimum amount of lubricating oil can be supplied, resulting in restraint of needless or excessive supply of lubricating oil.

Furthermore, when the vehicle is running and that the wet clutch is in engagement, the distribution controller is controlled to control the switching valve so as to provide fluid communication between the lubrication passage and the second passage. Thus, when smaller heat is generated with the clutch being in full engagement, minimum amount of lubricating oil can be supplied, resulting in restraint of needless or excessive supply of lubricating oil.

Further, when the wet clutch is in slippage, the distribution controller is controlled to control the switching valve so as to provide fluid communication between the lubrication passage and the first passage. Thus, when greater heat is generated when the clutch is in slippage during vehicle running, maximum amount of lubricating oil can be supplied, resulting in restraint of heating of the clutch.

Still further, the distribution controller comprises a duty solenoid or a linear solenoid, allowing finer control of supply of lubricating oil in accordance with the vehicle operating conditions.

Still further, the wet clutch comprises an electromagnetic multiple disc clutch comprising a pilot clutch engaged by an electromagnetic force of an electromagnet, a torque cam mechanism for converting an engaging force of the pilot clutch into an axial thrust force, and a main clutch engaged by the axial thrust force of the torque cam mechanism, wherein the system further comprises a lubrication system for the electromagnetic multiple disc clutch, the lubrication system comprising a first portion for the electromagnet and a bearing arranged in the vicinity thereof, and a second portion for clutch plates of the pilot clutch and the main clutch, wherein the lubrication passage is connected to the second portion of the lubrication system. With the electromagnetic multiple disc clutch being not in engagement when the vehicle is at a standstill, the electromagnet and the bearing generate less amount of heat, requiring less amount of lubricating oil. On the other hand, when the temperature of lubricating oil is lower, the clutch plates often produce drag torque, requiring lubrication control in accordance with the temperature of lubricating oil. The present invention ensures appropriate lubrication control to the target systems to be controlled based on different concepts, allowing supply of required amount of lubricating oil in accordance with the conditions without having needless lubrication, resulting not only in optimized balance of the amount of lubricating oil, but also in enhanced fuel consumption due to reduction in pump load.

Furthermore, the system further comprises a pressure regulator valve arranged on the third passage upstream of the oil cooler, and a pressure controller which controls the pressure regulator valve. It is noted that when the engine speed is lower, the flow rate of lubricating oil is reduced accordingly. According to the present invention, even when the engine speed is lower, the pressure regulator valve allows supply of required amount of lubricating oil. Moreover, the pressure regulator valve ensures setting of the lubrication pressure in consideration of the line resistance when feeding lubricating oil through the oil cooler, allowing supply of required amount of lubricating oil.

Further, when the temperature of lubricating oil is equal to or smaller than a predetermined temperature, the pressure controller is controlled to set the pressure of the pressure regulator valve at a first value which is smaller than a predetermined value. Thus, when no cooling is needed, the flow rate of lubricating oil can be decreased to increase the temperature thereof to an adequate range.

Still further, when the temperature of lubricating oil is greater than the predetermined temperature and that the wet clutch is in slippage, the pressure controller is controlled to set the pressure of the pressure regulator valve at a second value which is greater than the predetermined value. Thus, the flow rate of lubricating oil can be increased by raising the pressure of lubricating oil. This allows not only sure prevention of heat generation resulting from slippage, but also enhancement in durability of plates of the wet clutch.

Still further, the switching valve is arranged downstream of the oil cooler, allowing adequate distribution of the lubricating oil between the wet clutch and various lubrication points.

Further, since the switching valve has a lubricating-oil distribution ratio switched between at least two values, allowing finer distribution of lubricating oil between the wet clutch and various lubrication points.

Still further, when the wet clutch is in one of engagement and non-engagement, the distribution controller is controlled to set the distribution ratio of the switching valve at a smaller one of the at least two values. Thus, when less heat is generated, minimum amount of lubricating oil can be supplied.

Furthermore, when the wet clutch is in slippage, the distribution controller is controlled to set the distribution ratio for the switching valve at a greater one of the at least two values. It is noted that, for example, the start clutch which generates creep torque by slip control can produce greater and longer slippage. Then, when the wet clutch is in slippage, maximum amount of lubricating oil can be supplied to prevent heat generation and enhance the durability of the clutch.

Having described the present invention in connection with the illustrative embodiments, it is noted that the present invention is not limited thereto, and various changes and modifications can be made without departing from the scope of the present invention. By way of example, the start clutch or wet clutch may include a hydraulic clutch of single or multiple disc type in place of the electromagnetic multiple disc clutch. Particularly, when applied to a friction element for ensuring slip control upon occurrence of creep torque, start of the vehicle, and the like, the present invention allows prevention of heating of friction element, and enhancement in durability thereof. Moreover, the distribution controller may include a linear solenoid in place of the duty solenoid.

The entire teachings of Japanese Patent Application P2003-122959 filed Apr. 25, 2003 and Japanese Patent Application P2003-122958 are hereby incorporated by reference.

What is claimed is:

1. A hydraulic control system for an automatic transmission with a wet clutch serving as a start element and points to be lubricated, comprising:
    a lubrication passage which feeds a lubricating oil to the wet clutch and the points of the transmission;
    a first passage with a large-diameter orifice;
    a second passage with a small-diameter orifice,
    the first and second passages being arranged upstream of the lubrication passage;
    a switching valve which switches fluid communication between the lubrication passage and the first and second passages;
    a distribution controller which controls the switching valve; and
    an electronic control unit (ECU) which controls the distribution controller.

2. The hydraulic control system as claimed in claim 1, further comprising:
    a third passage arranged upstream of the first and second passages; and
    a cooler arranged on the third passage, the cooler cooling down the lubricating oil.

3. The hydraulic control system as claimed in claim 1, wherein the ECU is programmed to:
    determine whether or not a vehicle is at a standstill;
    determine, when the vehicle is at a standstill, whether or not a temperature of the lubricating oil is equal to or smaller than a first predetermined temperature; and
    control, when the temperature is equal to or smaller than the first predetermined temperature, the distribution controller to control the switching valve so as to shut off fluid communication between the lubrication passage and the first and second passages.

4. The hydraulic control system as claimed in claim 3, wherein the ECU is further programmed to:
    determine, when the temperature is greater than the first predetermined temperature, whether or not the temperature of the lubricating oil is equal to or smaller than a second predetermined temperature which is greater than the first predetermined temperature;
    calculate, when the temperature is equal to or smaller than the second predetermined temperature, a supply ratio of the lubricating oil in accordance with the temperature; and
    control, in accordance with the calculated supply ratio, the distribution controller to control the switching valve so as to provide intermittent fluid communication between the lubrication passage and the second passage.

5. The hydraulic control system as claimed in claim 4, wherein the ECU is further programmed to:
    control, when the temperature is greater than the second predetermined temperature, the distribution controller to control the switching valve so as to provide fluid communication between the lubrication passage and the second passage.

6. The hydraulic control system as claimed in claim 3, wherein the ECU is further programmed to:
    determine, when the vehicle is running, whether or not the wet clutch is in engagement; and
    control, when the wet clutch is in engagement, the distribution controller to control the switching valve so as to provide fluid communication between the lubrication passage and the second passage.

7. The hydraulic control system as claimed in claim 6, wherein the ECU is further programmed to:
    control, when the wet clutch is in slippage, the distribution controller to control the switching valve so as to provide fluid communication between the lubrication passage and the first passage.

8. The hydraulic control system as claimed in claim 1, wherein the distribution controller comprises one of a duty solenoid and a linear solenoid.

9. The hydraulic control system as claimed in claim 1, wherein the wet clutch comprises an electromagnetic multiple disc clutch comprising a pilot clutch engaged by an electromagnetic force of an electromagnet, a torque cam mechanism for converting an engaging force of the pilot clutch into an axial thrust force, and a main clutch engaged by the axial thrust force of the torque cam mechanism, the system further comprising:
    a lubrication system for the electromagnetic multiple disc clutch, the lubrication system comprising a first portion for the electromagnet and a bearing arranged in the vicinity thereof, and a second portion for clutch plates of the pilot clutch and the main clutch,
    wherein the lubrication passage is connected to the second portion of the lubrication system.

10. The hydraulic control system as claimed in claim 2, further comprising:
    a pressure regulator valve arranged on the third passage upstream of the cooler, the pressure regulator valve regulating a pressure of the lubricating oil; and
    a pressure controller which controls the pressure regulator valve in accordance with a command of the ECU.

11. The hydraulic control system as claimed in claim 10, wherein the ECU is programmed to:
    determine whether or not a temperature of the lubricating oil is equal to or smaller than a predetermined temperature; and
    control, when the temperature is equal to or smaller than the predetermined temperature, the pressure controller to set a pressure of the pressure regulator valve at a first value which is smaller than a predetermined value.

12. The hydraulic control system as claimed in claim 11, wherein the ECU is further programmed to:
    determine, when the temperature is greater than the predetermined temperature, whether or not the wet clutch is in engagement; and
    control, when the wet clutch is in slippage, the pressure controller to set the pressure of the pressure valve at a second value which is greater than the predetermined value.

13. The hydraulic control system as claimed in claim 12, wherein the switching valve is arranged downstream of the cooler.

14. The hydraulic control system as claimed in claim 13, wherein the switching valve has a ratio for the lubricating oil distributed between the wet clutch and the points of the transmission, the ratio being switched between at least two values.

15. The hydraulic control system as claimed in claim 14, wherein the ECU is further programmed to:
control, when the wet clutch is in one of engagement and non-engagement, the distribution controller to set the ratio of the switching valve at a smaller one of the at least two values.

16. The hydraulic control system as claimed in claim 14, wherein the ECU is further programmed to:
control, when the wet clutch is in slippage, the distribution controller to set the ratio of the switching valve at a greater one of the at least two values.

17. A hydraulic control system for an automatic transmission with a wet clutch serving as a start element and points to be lubricated, comprising:
a lubrication passage which feeds a lubricating oil to the wet clutch and the points of the transmission;
a switching valve which switches fluid communication to the wet clutch and the points of the transmission;
a distribution controller which controls the switching valve;
a cooler arranged on the lubrication passage, the cooler cooling down the lubricating oil;
a pressure regulator valve arranged on the lubrication passage upstream of the cooler, the pressure regulator valve regulating a pressure of the lubricating oil;
a pressure controller which controls the pressure regulator valve; and
an electronic control unit (ECU) which determines a temperature of the lubricating oil and controls the distribution controller and the pressure controller in accordance with the determined temperature.

18. A method of controlling a hydraulic system for an automatic transmission with a wet clutch serving as a start element and points to be lubricated, the method comprising:
providing the system, the system comprising:
a lubrication passage which feeds a lubricating oil to the wet clutch and the points of the transmission;
a first passage with a large-diameter orifice;
a second passage with a small-diameter orifice,
the first and second passages being arranged upstream of the lubrication passage;
a switching valve which switches fluid communication between the lubrication passage and the first and second passages;
a distribution controller which controls the switching valve; and
an electronic control unit (ECU) which controls the distribution controller;
determining whether or not a vehicle is at a standstill;
determining, when the vehicle is at a standstill, whether or not a temperature of the lubricating oil is equal to or smaller than a first predetermined temperature; and
controlling, when the temperature is equal to or smaller than the first predetermined temperature, the distribution controller to control the switching valve so as to shut off fluid communication between the lubrication passage and the first and second passages.

19. The method as claimed in claim 18, further comprising:
determining, when the temperature is greater than the first predetermined temperature, whether or not the temperature of the lubricating oil is equal to or smaller than a second predetermined temperature which is greater than the first predetermined temperature; and calculating, when the temperature is equal to or smaller than the second predetermined temperature, a supply ratio of the lubricating oil in accordance with the temperature; and
controlling, in accordance with the calculated supply ratio, the distribution controller to control the switching valve so as to provide intermittent fluid communication between the lubrication passage and the second passage.

20. The method as claimed in claim 19, further comprising:
controlling, when the temperature is greater than the second predetermined temperature, the distribution controller to control the switching valve so as to provide fluid communication between the lubrication passage and the second passage.

21. The method as claimed in claim 18, further comprising:
determining, when the vehicle is running, whether or not the wet clutch is in engagement; and
determining whether or not the wet clutch is in engagement; and
controlling, when the wet clutch is in engagement, the distribution controller to control the switching valve so as to provide fluid communication between the lubrication passage and the second passage.

22. The method as claimed in claim 21, further comprising:
controlling, when the wet clutch is in slippage, the distribution controller to control the switching valve so as to provide fluid communication between the lubrication passage and the first passage.

23. A method of controlling a hydraulic system for an automatic transmission with a wet clutch serving as a start element and points to be lubricated, the system comprising:
a lubrication passage which feeds a lubricating oil to the wet clutch and the points of the transmission;
a switching valve which switches fluid communication to the wet clutch and the points of the transmission;
a distribution controller which controls the switching valve;
a cooler arranged on the lubrication passage, the cooler cooling down the lubricating oil;
a pressure regulator valve arranged on the lubrication passage upstream of the cooler, the pressure regulator valve regulating a pressure of the lubricating oil; and
a pressure controller which controls the pressure regulator valve,
the method comprising:
determining whether or not a temperature of the lubricating oil is equal to or smaller than a predetermined temperature; and
controlling, when the temperature is equal to or smaller than the predetermined temperature, the pressure controller to set a pressure of the pressure regulator valve at a first value which is smaller than a predetermined value.

24. The method as claimed in claim 23, further comprising:
determining, when the temperature is greater than the predetermined temperature, whether or not the wet clutch is in engagement; and
controlling, when the wet clutch is in slippage, the pressure controller to set the pressure of the pressure valve at a second value which is greater than the predetermined value.

25. The method as claimed in claim 24, wherein the switching valve has a ratio for the lubricating oil distributed between the wet clutch and the points of the transmission, the ratio being switched between at least two values, the method further comprising:

controlling, when the wet clutch is in one of engagement and non-engagement, the distribution controller to set the distribution ratio of the switching valve at a smaller one of the at least two values.

26. The method as claimed in claim 25, further comprising:

controlling, when the wet clutch is in slippage, the distribution controller to set the distribution ratio of the switching valve at a greater one of the at least two values.

* * * * *